US012514789B2

(12) United States Patent
Vogt et al.

(10) Patent No.: US 12,514,789 B2
(45) Date of Patent: Jan. 6, 2026

(54) CAPSULE FILLING MACHINE FOR FILLING A CAPSULE AND METHOD FOR OPERATING A CAPSULE FILLING MACHINE

(71) Applicant: Syntegon Technology GmbH, Waiblingen (DE)

(72) Inventors: Martin Vogt, Stuttgart (DE); Werner Runft, Winnenden (DE); Walter Böhringer, Remshalden (DE); Thomas Franck, Lorch (DE); Jens Schlipf, Freiberg (DE)

(73) Assignee: Syntegon Technology GmbH, Waiblingen (DE)

( * ) Notice: Subject to any disclaimer, the term of this patent is extended or adjusted under 35 U.S.C. 154(b) by 46 days.

(21) Appl. No.: 18/509,938

(22) Filed: Nov. 15, 2023

(65) Prior Publication Data

US 2024/0164991 A1 May 23, 2024

(30) Foreign Application Priority Data

Nov. 17, 2022 (DE) ..................... 10 2022 130 430.2

(51) Int. Cl.
*A61J 3/07* (2006.01)

(52) U.S. Cl.
CPC ............... *A61J 3/074* (2013.01); *A61J 3/071* (2013.01); *A61J 3/072* (2013.01)

(58) Field of Classification Search
CPC . A61J 3/071; A61J 3/072; A61J 3/074; B65B 1/04; B65B 29/022; Y10S 53/90
(Continued)

(56) References Cited

U.S. PATENT DOCUMENTS 2,630,953 A * 3/1953 Kath ........................ A61J 3/074 141/237
2,742,749 A * 4/1956 Mcguire ................. A61J 3/075 53/390
(Continued)

FOREIGN PATENT DOCUMENTS

DE 2830849 A1 1/1980
DE 10001068 C1 * 5/2001 .............. A61J 3/074
(Continued)

OTHER PUBLICATIONS

European Patent Office Expanded Search Report for Application No. 23201519.8 dated Mar. 26, 2024 (12 pages including English machine translation).
(Continued)

*Primary Examiner* — Robert F Long
*Assistant Examiner* — Eduardo R Ferrero
(74) *Attorney, Agent, or Firm* — Michael Best & Friedrich LLP

(57) ABSTRACT

A capsule filling machine (10) for filling a capsule, which has a capsule upper part and a capsule lower part, includes a conveying device (32), a filling station (82) and at least one station (86) for closing a filled capsule lower part with a capsule upper part and for transporting a filled capsule. The station comprises a closing element which can be moved along the joining axis and which is driven by a closing drive, and which cooperates with a lower face of the filled capsule lower part, and a counter holder which cooperates with an upper face of the capsule upper part. The counter holder can be arranged in a stop region which is spaced apart from a conveying region by the interposition of a transport region. A transport sleeve which fixes and transports the filled and fully joined capsule outside the conveying region is arranged in the transport region.

17 Claims, 13 Drawing Sheets

(58) Field of Classification Search
USPC ....... 53/454, 560, 900, 268, 270, 275, 284.5
See application file for complete search history.

(56) References Cited

U.S. PATENT DOCUMENTS

| | | | | | |
|---|---|---|---|---|---|
| 2,831,301 | A * | 4/1958 | Martell | A61J 3/074 53/79 |
| 3,186,910 | A * | 6/1965 | Glassman | A61J 3/071 424/435 |
| 3,324,902 | A * | 6/1967 | Lense | A61J 3/074 141/12 |
| 3,527,015 | A | 9/1970 | Aronson et al. | |
| 3,534,526 | A | 10/1970 | Hostetler et al. | |
| 3,537,613 | A * | 11/1970 | Greer | A61J 3/074 221/68 |
| 3,552,095 | A * | 1/1971 | Inman | A61J 3/075 53/900 |
| 3,601,954 | A * | 8/1971 | Aronson | A61J 3/074 198/803.14 |
| 4,006,578 | A * | 2/1977 | Gamberini | A61J 3/074 53/282 |
| 4,163,354 | A * | 8/1979 | Austin | A61J 3/074 53/282 |
| 4,403,461 | A * | 9/1983 | Goutard | A61J 3/072 53/900 |
| 4,581,875 | A * | 4/1986 | MacLaughlin | B29C 66/71 53/900 |
| 4,615,165 | A * | 10/1986 | Gamberini | A61J 3/074 53/381.1 |
| 4,667,455 | A * | 5/1987 | Morrow | B29C 66/542 53/329.2 |
| 4,731,979 | A * | 3/1988 | Yamamoto | A61J 3/074 53/529 |
| 4,866,906 | A * | 9/1989 | Tayebi | A61J 3/072 53/900 |
| 4,959,943 | A * | 10/1990 | Yamamoto | A61J 3/074 53/900 |
| 4,964,262 | A * | 10/1990 | Moser | A61J 3/074 53/506 |
| 5,018,335 | A * | 5/1991 | Yamamoto | A61J 3/074 53/900 |
| 5,240,049 | A * | 8/1993 | Chiari | A61J 3/074 141/81 |
| 5,417,030 | A * | 5/1995 | Ribani | A61J 3/074 53/367 |
| 5,743,069 | A * | 4/1998 | Ansaloni | A61J 3/074 53/167 |
| 5,966,910 | A * | 10/1999 | Ribani | A61J 3/074 53/291 |
| 6,050,308 | A * | 4/2000 | Wurst | G01F 11/24 141/81 |
| 6,114,636 | A * | 9/2000 | Cane' | G01G 17/00 209/592 |
| 6,189,676 | B1 * | 2/2001 | Ansaloni | B65G 47/256 198/399 |
| 6,367,228 | B1 * | 4/2002 | Wurst | A61J 3/074 53/53 |
| 6,546,702 | B1 * | 4/2003 | Pickett | A61J 3/074 53/286 |
| 6,568,151 | B2 * | 5/2003 | Buckley | B65G 15/58 198/803.14 |
| 7,343,724 | B1 * | 3/2008 | Williams | A61J 3/074 53/287 |
| 7,792,247 | B2 * | 9/2010 | Schmied | A61J 3/074 378/53 |
| 2004/0003866 | A1 * | 1/2004 | Rocchio | B65B 1/24 141/73 |
| 2005/0217207 | A1 * | 10/2005 | Konishi | A61J 3/074 53/53 |
| 2007/0044433 | A1 | 3/2007 | Runft et al. | |
| 2008/0134629 | A1 * | 6/2008 | Schmied | A61J 3/074 53/55 |
| 2008/0219803 | A1 * | 9/2008 | Runft | A61J 3/074 414/800 |
| 2010/0164144 | A1 * | 7/2010 | Kuhnle | A61J 3/074 425/139 |
| 2011/0088355 | A1 * | 4/2011 | Fulper | A61J 3/074 53/111 R |
| 2011/0146840 | A1 * | 6/2011 | Ansaloni | A61J 3/074 141/129 |
| 2013/0206484 | A1 | 8/2013 | Consoli et al. | |
| 2018/0271750 | A1 * | 9/2018 | Wurst | B65B 7/2807 |
| 2019/0154529 | A1 * | 5/2019 | Schlipf | G01L 1/00 |
| 2020/0408585 | A1 * | 12/2020 | Wick | A61J 3/074 |
| 2021/0177700 | A1 * | 6/2021 | Ribani | B65B 1/06 |

FOREIGN PATENT DOCUMENTS

| | | |
|---|---|---|
| JP | H02180265 A | 7/1990 |
| JP | 3894239 B2 | 3/2007 |
| JP | 2013001450 A | 1/2013 |

OTHER PUBLICATIONS

Japanese Patent Office Notice of Reasons for Refusal for Application No. 2023195192 dated Oct. 2, 2024 (9 pages including English machine translation).
German Patent Office Examination Report for Application No. 102022130430.2 dated Jul. 7, 2023 (8 pages including English Translation).

* cited by examiner

CAPSULE FILLING MACHINE FOR FILLING A CAPSULE AND METHOD FOR OPERATING A CAPSULE FILLING MACHINE

BACKGROUND

The invention relates to a capsule filling machine.

Capsule filling machines of the type mentioned in the introduction are disclosed in DE 28 30 849 A1 and U.S. Pat. No. 3,534,526 A.

SUMMARY

Proceeding therefrom, the object of the invention is to specify an alternative capsule filling machine.

The invention achieves this object by the counter holder being able to be arranged or being arranged, at least for a final part of the joining path between the filled capsule lower part and the capsule upper part, in a stop region which, when viewed along the joining axis, is spaced apart from the conveying region by the interposition of a transport region, wherein a transport sleeve which fixes and transports the filled and fully joined capsule outside the conveying region is arranged in the transport region.

Due to the spacing of the stop region from the conveying region it is possible to use this intermediate space as a transport region and to provide the transport sleeve, in particular, in the transport region.

The arrangement of the counter holder in the stop region is also associated with a displacement of the final joining path from the conveying region (as implemented in the prior art) into the transport region. Since the filled and fully joined capsule can be fixed in the transport sleeve, this permits a transport of the filled and fully joined capsule immediately following the final part of the joining path and, in particular, without a further movement of the closing element and/or the counter holder.

In a preferred embodiment, a height of the transport region measured between the conveying region and the stop region corresponds at least to the length of a filled and fully joined capsule. As a result, it is ensured that the entire fully joined capsule can be received in the transport region, and a particularly secure transport of the capsule out of the transport region is possible. In particular, damage to the capsule (for example by the capsule being dragged along a surface adjoining the conveying region) is prevented.

It is further preferred if the counter holder can be moved along the joining axis, and in the conveying region and/or in the transport region acts on the upper face of the capsule upper part. At the start of the joining of the capsule parts, i.e. with the initial insertion of the capsule lower part into the capsule upper part, there is the risk that the capsule upper part is displaced in an uncontrolled manner by the capsule lower part and thereby, for example, the capsule lower part is canted with or in the capsule upper part. Due to the movement of the counter holder in the conveying region and/or transport region, the capsule upper part in the conveying region and/or transport region is already subjected by the counter holder to a force which is oriented opposite the direction of movement of the closing element and ensures the correct insertion of the capsule lower part into the capsule upper part.

During the joining process, the capsule upper part is subjected by the mating surface of the counter holder to a force which is oriented opposite the direction of movement of the closing element.

Particularly preferably, the counter holder which is arranged in the conveying region or the transport region can be moved into the stop region by a movement of the closing element which is transmitted to the counter holder via the capsule parts. This is associated with a potential simplification of the control of the movement of the counter holder. In the simplest case, it is sufficient to control a potentially desired movement of the counter holder only for a direction of movement out of the stop region and into the transport region or the conveying region. However, a return of the counter holder in the reverse direction of movement back into the stop region can take place passively and can be controlled via the closing element.

It is further preferred if the counter holder exerts, on the upper face of the capsule upper part, a force which opposes the direction of movement of the closing element. This force assists the joining process of the capsule upper part with the capsule lower part.

It is also preferred if the closing drive is designed such that the closing element moves along the joining axis, starting from an initial contact with the lower face of the filled capsule lower part up to the completion of the final part of the joining path, without interruption and stoppage. This permits a simplified control of the movement of the closing element since only an initial position and an end position of the closing element have to be defined along the joining axis. Moreover, the movement without interruption and stoppage shortens the time required for joining the capsule parts.

Particularly preferably, the capsule upper part receiver has a holding region for receiving and holding the capsule upper part and a guide region facing the capsule lower part receiver for receiving and guiding the capsule lower part. A secure and reproducible positioning of the capsule upper part is ensured in the capsule upper part receiver by the holding region. The guide region serves for guiding and orienting the capsule lower part relative to the capsule upper part during the movement of the capsule lower part along the joining axis. In particular, a tilting of the capsule lower part relative to the joining axis is prevented by a lateral support of the capsule lower part in the guide region.

In particular, it is preferred if the holding region of the capsule upper part receiver is defined by an annular projection, an annular edge of the capsule upper part being able to be supported or being supported thereby. The annular projection represents a simple possibility of arranging the capsule upper part, in particular assisted by gravity, and at a well-defined and reproducible position inside the holding region.

It is also preferred if the length of the guide region of the capsule upper part receiver, when viewed along the joining axis, corresponds to at least 30% of the length of the capsule lower part, preferably at least 70% of the length of the capsule lower part, in particular at least 100% of the length of the capsule lower part. A longer guide region is associated with an improved guidance of the capsule lower part, since a larger proportion of the capsule lower part can be received and guided in the guide region.

A preferred embodiment provides that the capsule upper part receiver has a slotted wall. Since the volume enclosed by the capsule parts during the joining of the capsule parts is reduced, an excess pressure can be formed in the interior of the capsule. As a result, the (in particular gaseous) medium contained in the capsule is displaced out of the capsule and accumulates in the capsule upper part receiver, whereby an excess pressure can be formed in the capsule upper part receiver. The slotted wall ensures the drainage of the displaced medium out of the capsule upper part receiver and thus prevents, in particular, an inadvertent movement and/or ejection of the capsule upper part caused by the excess pressure.

Particularly preferably, the capsule upper part receiver and the capsule lower part receiver are configured in each case as format parts which can be inserted into the conveying device. The dimensions of the capsule upper part receiver and the capsule lower part receiver are adapted, in particular, to a specific capsule size. The insertable format parts permit a simple and rapid change between different capsule sizes.

In particular, it is preferred if the conveying device is configured in a disk-shaped manner and the conveying drive drives the conveying device about an axis of rotation of the conveying device. As a result, a particularly space-saving and efficient construction of the capsule filling machine is ensured.

It is also preferred if the transport sleeve is part of a transport device which is configured, in particular, as a sorting device. This permits the transport of the fully joined capsule from the transport region immediately following the joining of the capsule parts. If the transport device is configured as a sorting device, incorrectly filled and/or joined capsules can be removed in a simple manner from the production process (sorted into perfect/defective).

In a preferred embodiment, the transport device has a transport element and a transport drive which drives the transport element about a transport element axis which is ranged offset to the conveying device. In particular, the transport sleeve is part of the transport element, whereby a saving of space and an efficient construction of the transport device is made possible. By means of the transport drive it is possible to adapt the movement of the transport element about the transport element axis to the movement of the conveying device about the axis of rotation of the conveying device.

The object mentioned in the introduction is also achieved by a method for operating a capsule filling machine which comprises the features of the dependent method claim.

Advantages and embodiments of the method according to the invention are explained above with reference to the advantages and embodiments of the capsule filling machine according to the invention; thus reference will be made to the above description.

BRIEF DESCRIPTION OF THE DRAWINGS

Further features and advantages of the invention form the subject matter of the following description and the illustrated representation of a preferred embodiment.

In the drawing

DETAILED DESCRIPTION

The directions "up(wardly)" and "down(wardly)" are defined relative to the direction of gravity.

An embodiment of a capsule filling machine 10, denoted as a whole by the reference sign 10, serves for filling and closing capsules 12, preferably hard capsules, in particular gelatine capsules.

Figure 1A:
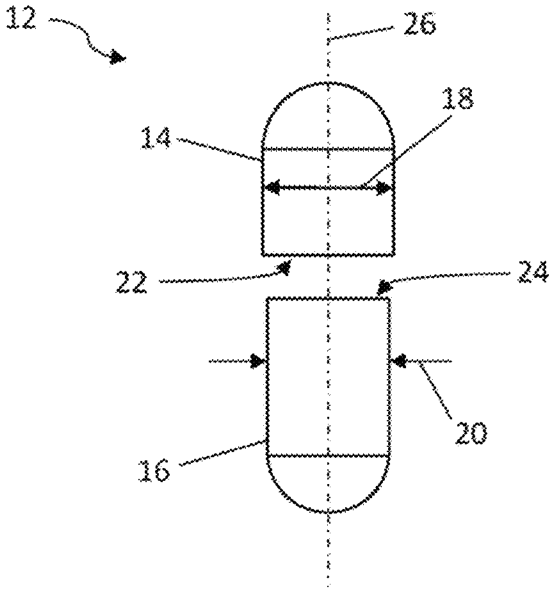
FIG. 1*a* shows a front view of a capsule with a capsule upper part and a capsule lower part in an unjoined state.
Figure 1B:
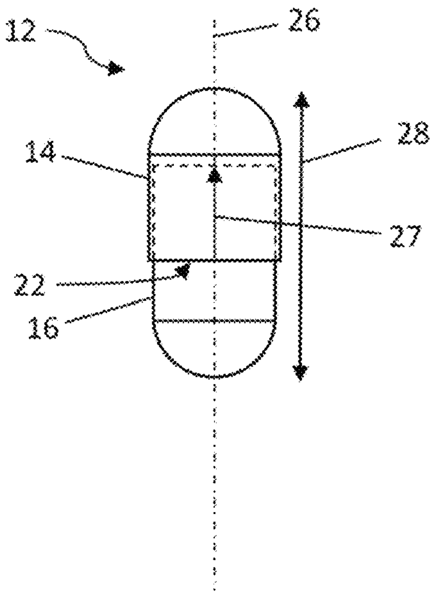
FIG. 1*b* shows a view of the capsule corresponding to FIG. 1*a* in a fully joined state.

FIGS. 1*a* and 1*b* show by way of example a capsule 12 in an unjoined state and in a fully joined state. The capsule 12 comprises a rotationally symmetrical capsule upper part 14 and a rotationally symmetrical capsule lower part 16. An internal diameter 18 of the capsule upper part 14 is slightly larger than an external diameter 20 of the capsule lower part 16. The capsule upper part 14 has a circular edge 22 facing the capsule lower part 16. The capsule lower part has a circular edge 24 facing the capsule upper part.

In an initial state and at the start of a joining process, the capsule upper part 14 and the capsule lower part 16 are arranged such that the respective edges 22 and 24 are arranged along a joining axis 26 at the same height. In order to close the capsule 12, the capsule lower part can be inserted along the joining axis into the capsule upper part, wherein the distance from the initial state to the full joining of the capsule 12 is denoted as the joining path 27. A length 28 of the fully joined capsule 12 extends parallel to the joining axis 26. A plurality of capsules 12 are stored, in a state where they are pushed in but not fully joined, in a store—not shown in the drawing—of a capsule filling machine 10 (see FIG. 2).

The capsule filling machine 10 comprises a horizontal working surface 30 on which a conveying device 32 and a plurality of working stations 80, 82, 86 are arranged. The conveying device 32 is configured to be disk-shaped and can be rotatably driven about an axis of rotation 34 of the conveying device, wherein a conveying drive 36 is arranged below the working surface 30 for driving the conveying device 32. The conveying device 32 has receivers 40 which are regularly arranged along its edge 38 for receiving the capsules 12 or the capsule parts 14, 16. The conveying device 32 transports the capsules 12 or the capsule parts 14, 16 between the working stations 80, 82, 86, wherein a conveying region 42 of the conveying device 32 is defined by a space in which the capsules 12 or capsule parts 14, 16 move when transported by means of the conveying device 32.

Figure 3:
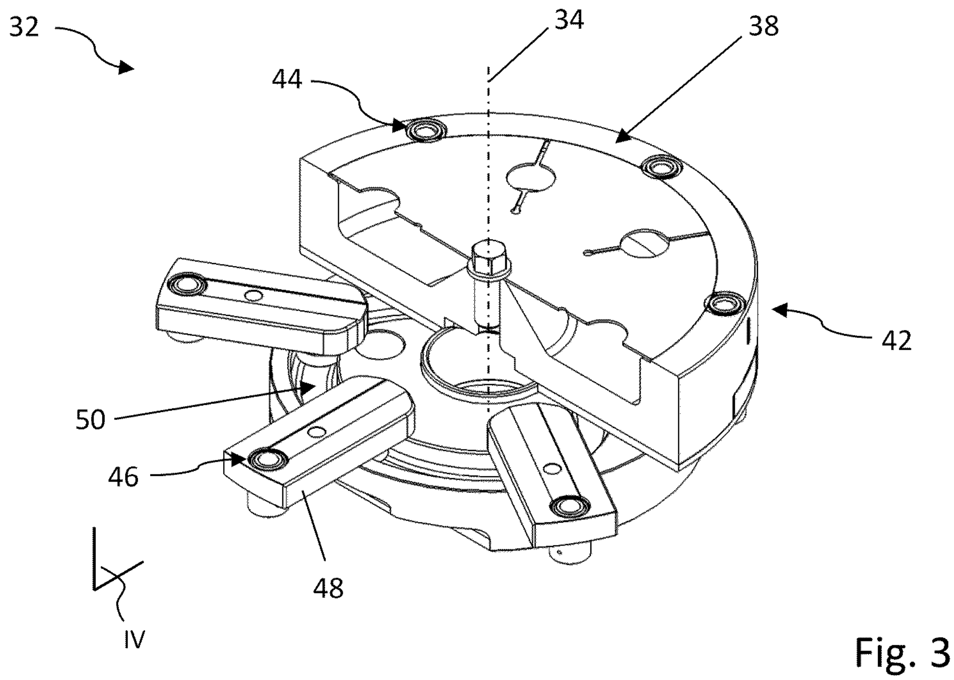
FIG. 3 shows a partially sectional perspective view of a conveying device of the capsule filling machine according to FIG. 2.

The receivers 40 for receiving the capsules 12 are configured by separate capsule upper part receivers 44 and capsule lower part receivers 46 which can be inserted in the conveying device 32, see FIG. 3. The capsule lower part receiver 46 is inserted into a capsule lower part receiver carrier 48. The capsule lower part receiver carrier 48 is guided in a control cam 50, running eccentrically relative to the axis of rotation 34 of the conveying device, and in this manner can be moved radially outwardly and radially inwardly during a rotational movement of the conveying device 32. As a result, it is possible to release the capsule lower part receiver 46 together with the capsule lower part

16 radially outwardly relative to the capsule upper part receiver 44 or the capsule upper part 14.

Figure 4:
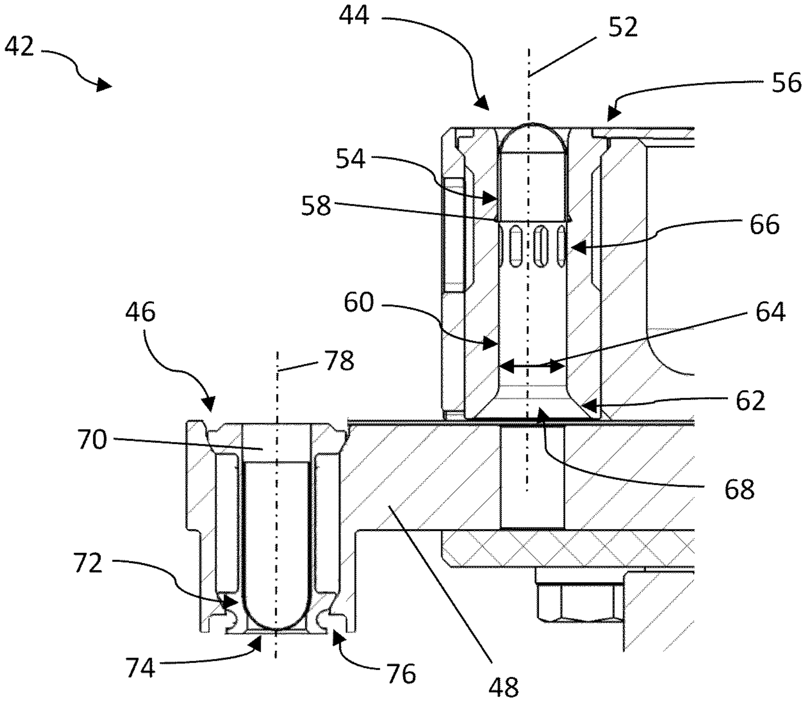
FIG. 4 shows a sectional view of the conveying device along a part of a cutting plane denoted in FIG. 3 by IV.

A holding region 54 is defined along a longitudinal axis 52 of the capsule upper part receiver 44, see FIG. 4. The holding region 54 is defined by an upper face 56 of the conveying device 32 and an internal annular projection 58. A capsule upper part 14 received in the holding region 54 is supported with its edge 22 on the projection 58 and can be held thereby in the capsule upper part receiver 44. The holding region 54 in the direction of the capsule lower part receiver carrier 48 adjoins a guide region 60 which, starting from the annular projection 58, extends to a lower end 62 of the capsule upper part receiver 44. An internal diameter 64 of the guide region 60 is adapted to the external diameter 20 of the capsule lower part 16 and is preferably slightly larger.

Preferably, the holding region 54 and/or the guide region 60 have a slotted wall 66. The capsule upper part receiver 44 also has an opening 68 at the lower end 62.

The capsule lower part receiver 46 has a receiving space 70 for receiving the capsule lower part 16. The capsule lower part 16 is supported on a tapering end 72 of the receiving space 70 and held in the receiving space 70. The capsule lower part receiver and the capsule lower part receiver carrier in each case have an opening 74, 76 at the tapering end 72.

In a fully inserted state of the capsule lower part receiver carrier 48 radially inwardly, the longitudinal axis 52 of the capsule upper part receiver 44 and a longitudinal axis 78 of the capsule lower part receiver 46 are aligned with one another.

Figure 2:
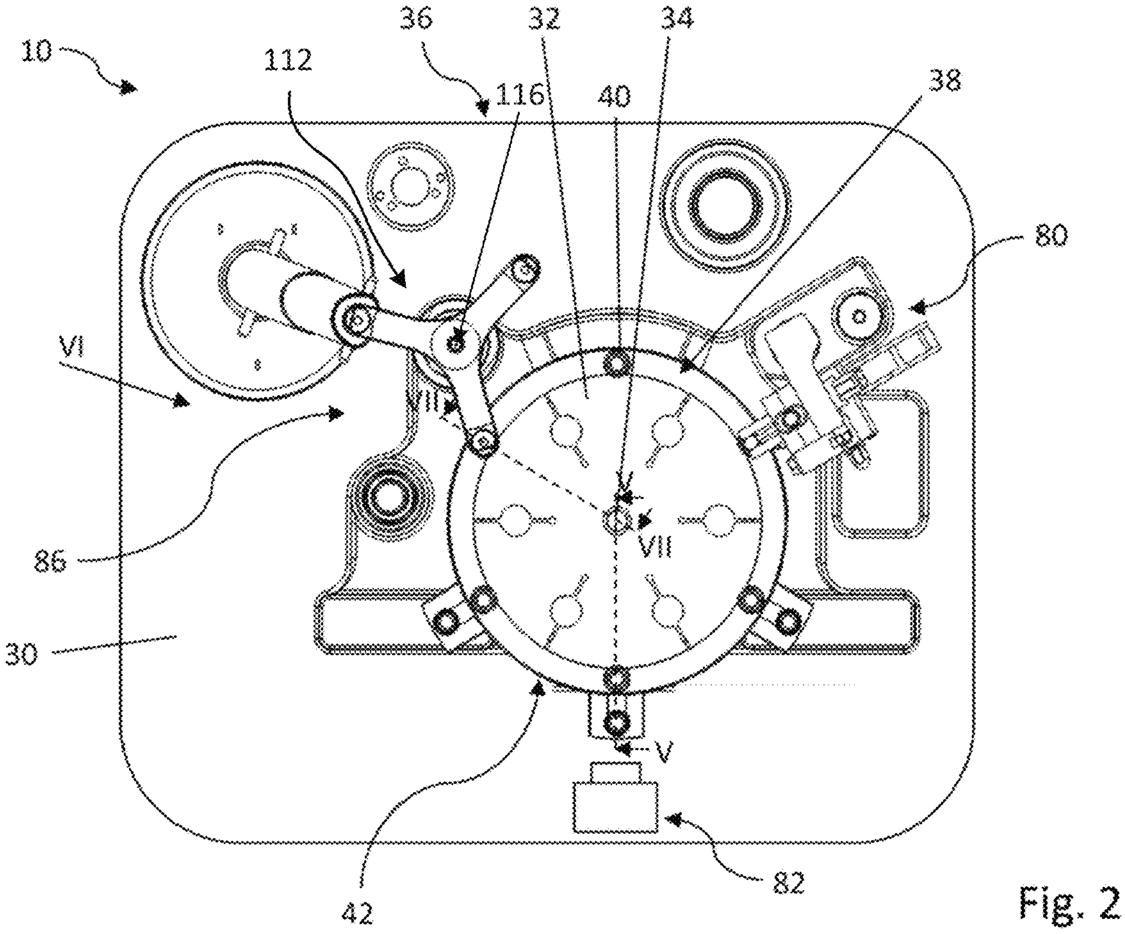
FIG. 2 shows a plan view of an embodiment of a capsule filling machine.

The capsules 12 which are stored in the store are fed by means of a feed station 80 to the receivers 40 of the conveying device 32, see FIG. 2. The conveying device 32 comes to a standstill. The capsules 12 are—in a manner known per se—oriented in the feed station 80 such that the capsule lower part 16 faces in the direction of the conveying region 42 and the joining axis 26 of the capsule 12 is aligned with the longitudinal axes 52, 72 of the capsule upper part receiver 44 and the capsule lower part receiver 46. In an initial state, the received capsule 12 (pushed in but not fully joined) is held in the holding region 54 of the capsule upper part receiver 44. Subsequently the capsule parts 14, 16 are separated from one another—in a manner known per se for example by means of a negative pressure—so that the capsule upper part 14 remains in the capsule upper part receiver 44 and the capsule lower part 16 is received in the capsule lower part receiver 46.

Figure 5:
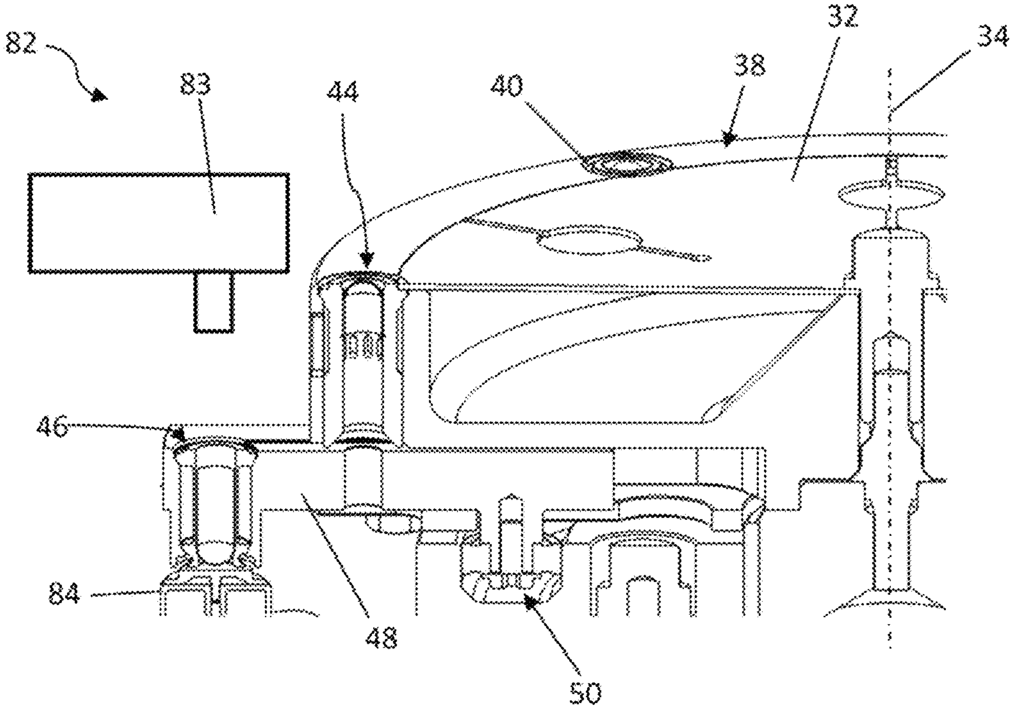
FIG. 5 shows a sectional perspective view of the conveying device and a metering device with a weighing cell along a cutting plane denoted in FIG. 2 by V-V.

By rotating the conveying device 32 about the axis of rotation 34 of the conveying device, the capsule parts 14, 16 are transported to a filling station 82. During the transport, the capsule lower part receiver carrier 48 is moved radially outwardly and thus the capsule lower part 16 is released, whereby the capsule lower part 16 can be filled with a filling material by a metering device 83, see FIG. 5.

The filling station 82 can comprise a weighing cell 84. By lowering the conveying device 32—by using a lifting/lowering drive, not shown—along the axis of rotation 34 of the conveying device, the capsule lower part receiver 46 can be deposited on the weighing cell 84 and released relative to the capsule lower part receiver carrier 48. Thus an accurate control and monitoring of the filling of the capsule lower part 16 with the filling material is ensured. It is possible that the capsule filling machine 10 comprises a plurality of filling stations 82 and/or metering devices 83 and/or weighing cells 84.

After filling the capsule lower part 16, the capsule parts 14, 16 are transported by a rotation of the conveying device 32 to a station 86 for closing and for transport, see FIG. 2. During the transport, the capsule lower part receiver carrier 48 is moved by means of the control cam 50 back into its radially inwardly inserted initial position.

The station 86 for closing and for transport comprises a closing device 88 with a closing element 90 arranged below the conveying device 32, see FIG. 6 and FIG. 7. The closing element 90 is configured, for example, in the shaped of a plunger and has a closing surface 92 at a free end. The closing element 90 can be driven by means of a closing drive 94. The closing element is movable along a closing axis 96 and parallel to the longitudinal axes 52, 72 of the capsule upper part receiver 44 and the capsule lower part receiver 46, and namely between an initial position in which the closing surface 92 is arranged below the conveying region 42 of the conveying device 32, and actuating positions in which the closing surface 92 is arranged inside and/or above the conveying region 42.

The closing device 88 also comprises a counter holder 98 which is arranged above the conveying device 32 and which is configured, for example, in the shape of a plunger and has a mating surface 100 at a free end. The counter holder 98 can be driven by means of a counter holder drive 102 along the longitudinal axes 52, 72 of the capsule upper part receiver 44 and the capsule lower part receiver 46. In an initial state, the mating surface 100 of the counter holder 98 is arranged in a stop region 104 of the closing device 88. The stop region 104 is arranged above the conveying region 42 and spaced apart therefrom.

A transport sleeve 106 is provided for the transport of a fully joined capsule 12. The transport sleeve 106 can receive and hold a fully joined capsule 12. The transport sleeve 106 is arranged, in particular, in a transport region 108 which is defined downwardly by the conveying region 42 and upwardly by the stop region 104. A height 109 of the transport region 108 preferably corresponds to the length 28 of a filled and fully joined capsule 12.

Figure 6:
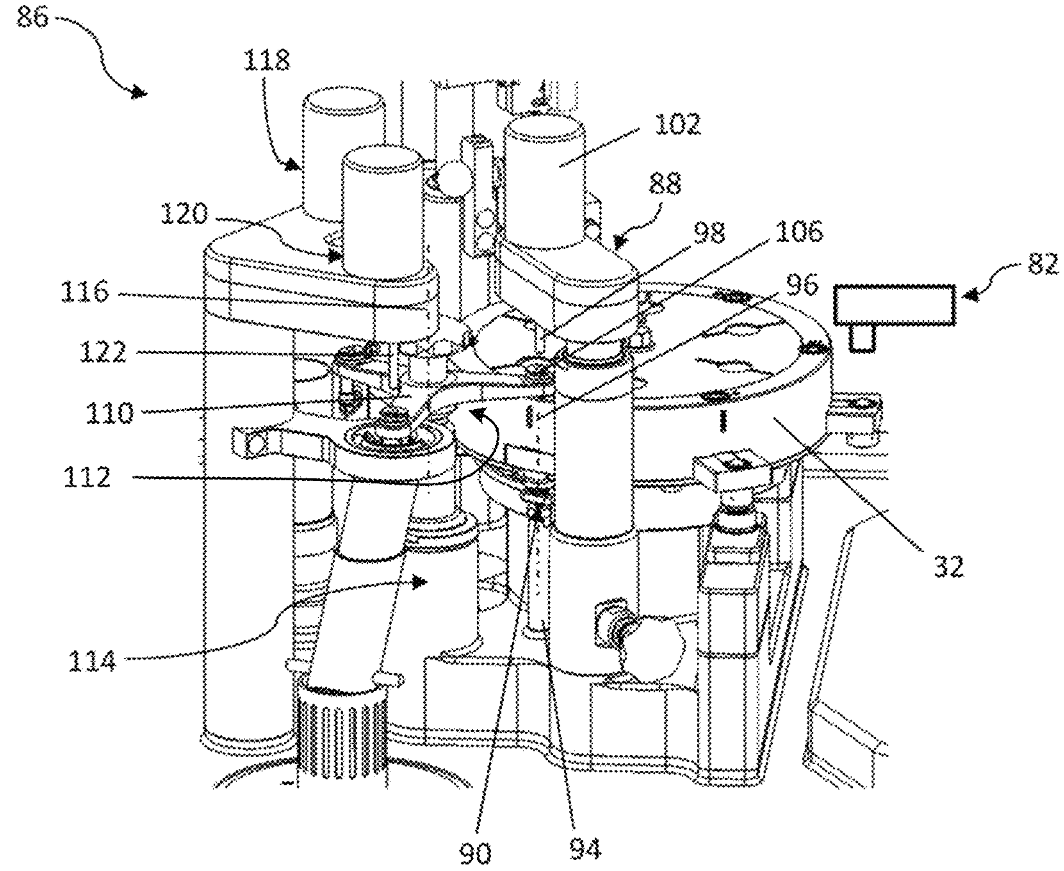
FIG. 6 shows a perspective view—corresponding to a viewing direction denoted in FIG. 2 by VI—of a station of the capsule filling machine according to FIG. 2 for the closing and transport of a capsule.
Figure 7:
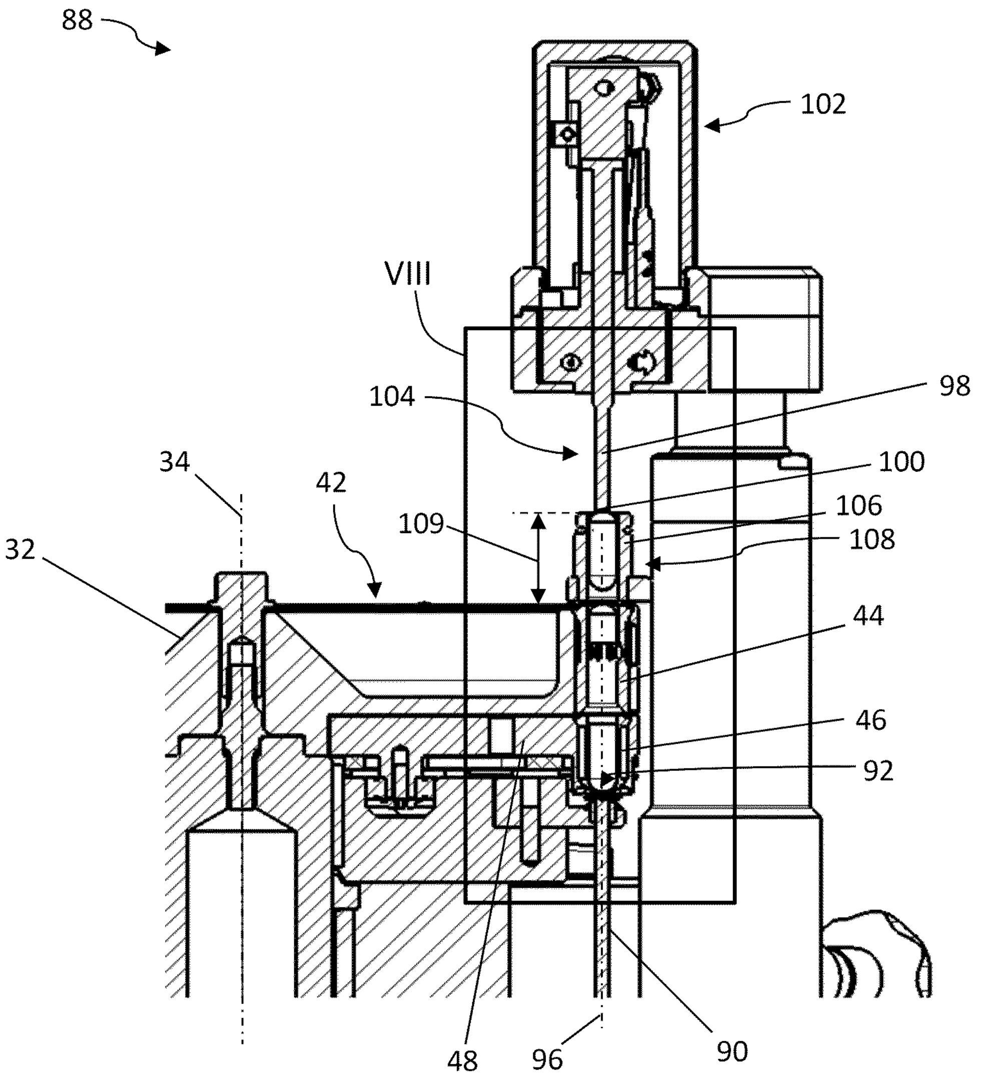
FIG. 7 shows a sectional view of the station according to FIG. 6 along a cutting plane denoted in FIG. 2 by VII-VII.

The transport sleeve 106 is part of a transport element 110 of a transport device 112, see FIG. 6. The transport element 110 can be driven by a transport drive 114 about a transport element axis 116, whereby a fully joined capsule 12 which is held in the transport sleeve 106 can be removed from the transport region 108.

Preferably, the transport device 112 comprises a first ejection station 118 and a second ejection station 120 with respective ejection elements 122, whereby the transport device 112 can be used as a sorting device (into perfect/defective). A capsule 12 received in the transport sleeve 106 can be transported by the transport element 110 to the respective ejection stations 118, 120. A correctly filled and joined capsule 12 is removed by the ejection element 122 at the first ejection station 118 from the transport sleeve 106; an incorrectly filled and/or joined capsule 12 is removed at the second ejection station 120.

In FIGS. 8 to 16 successive phases of the closing and the transport of a capsule 12 are shown.

In an initial state (see FIG. 8) a receiver 40 of the conveying device 32 is arranged in the station 86 for closing and for transport, wherein a capsule upper part 14 is arranged in the capsule upper part receiver 44 and a capsule lower part 16 which is filled with filling material is arranged in the capsule lower part receiver 46.

Figure 8:
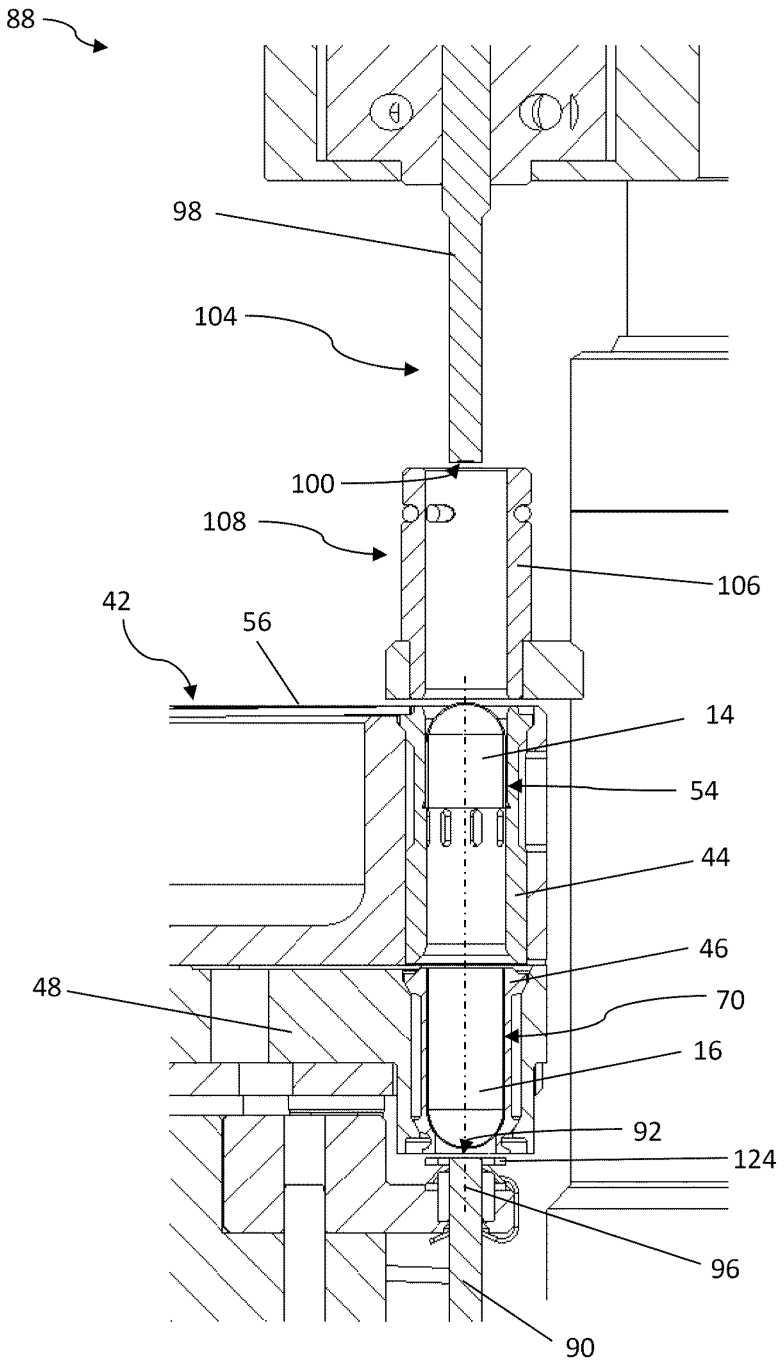
FIGS. 8 to 16 show a detail denoted in FIG. 7 by VIII in an enlarged view during successive phases of the closing and transport of a capsule.
Figure 9:
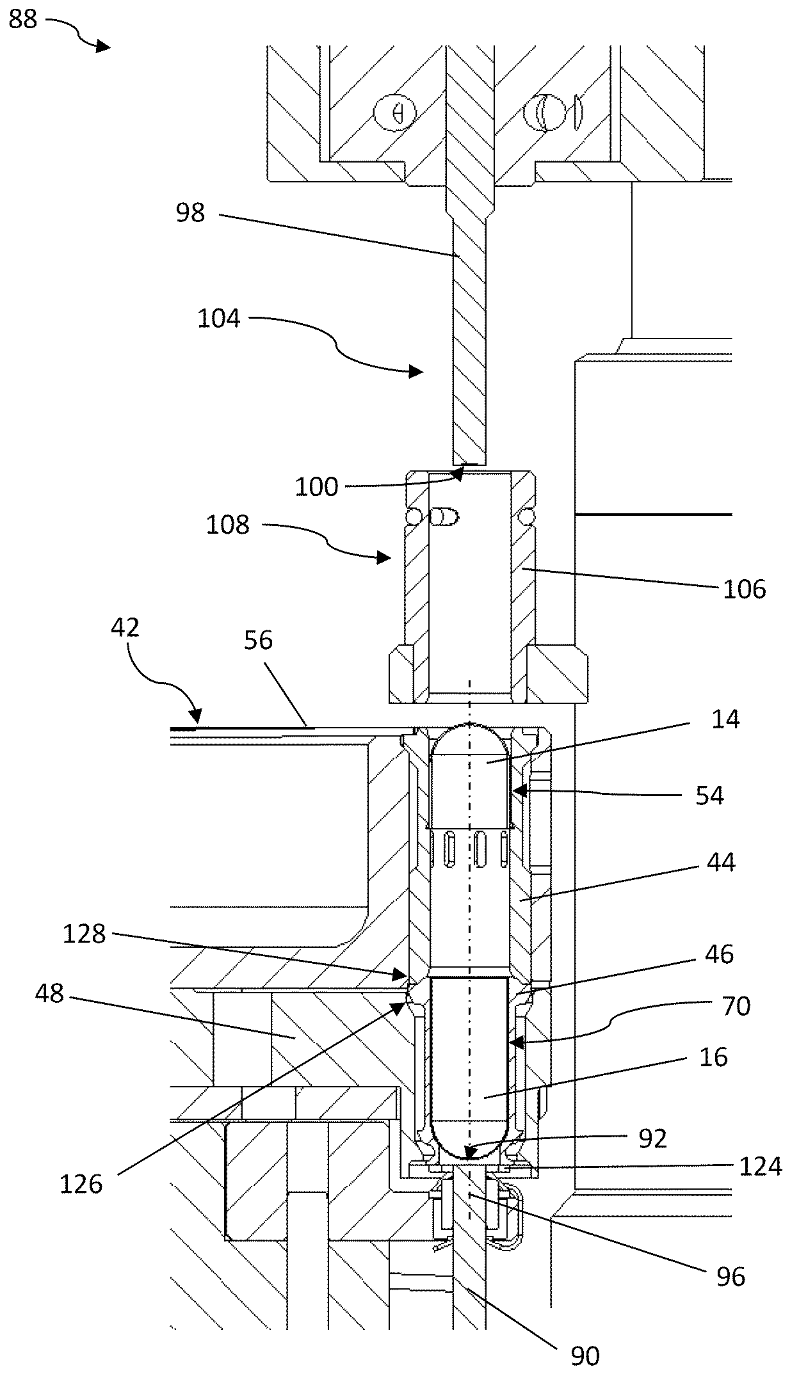
Figure 10:
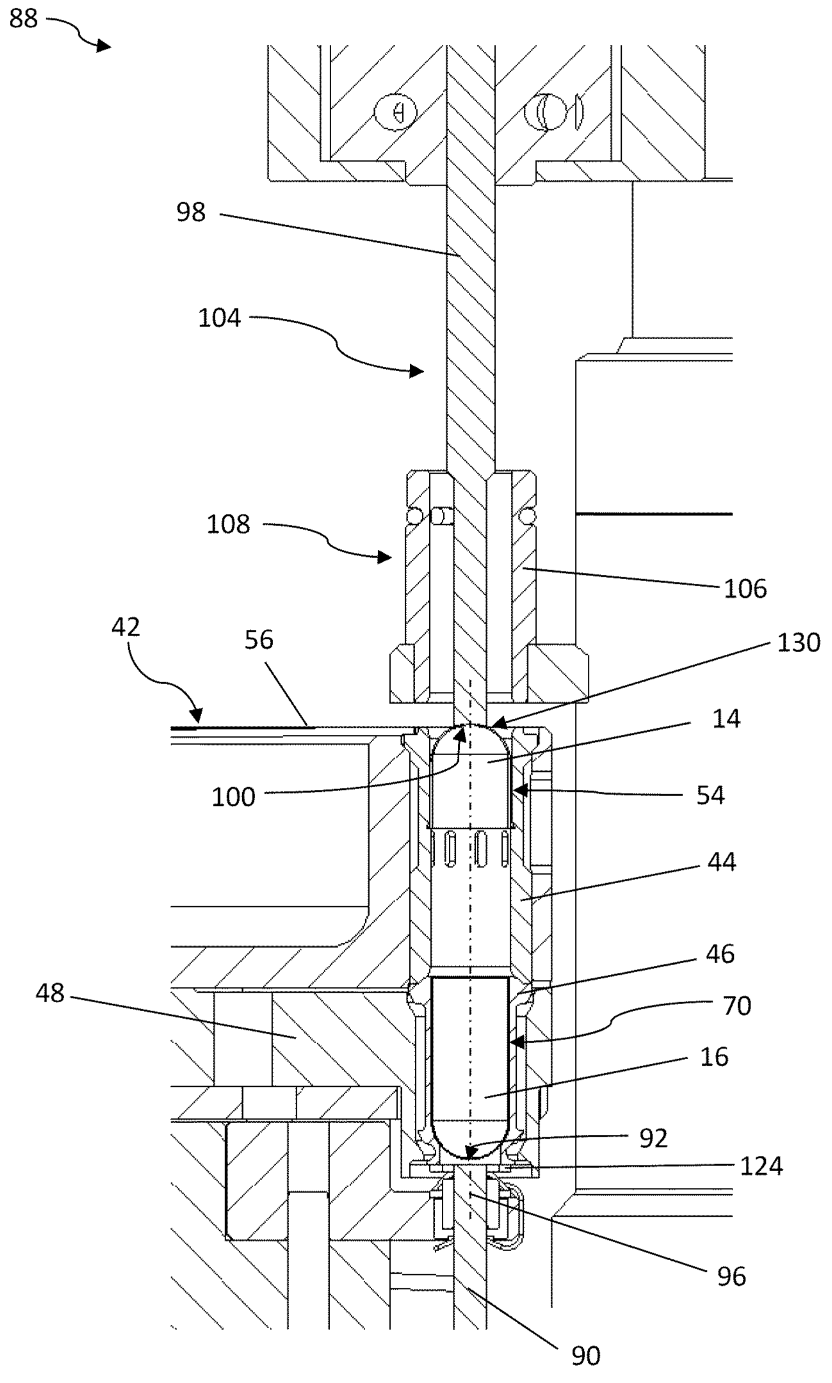

Proceeding from this initial state, the conveying device 32 is lowered by using the lifting/lowering drive parallel to the axis of rotation 34 of the conveying device (see FIG. 9, proceeding from FIG. 8). By lowering the conveying device 32, the capsule lower part receiver 46 is deposited on a depositing element 124 of the station 86 and displaced upwardly relative to the capsule lower part receiver carrier 48. This leads to a positive contact between an upper face 126 of the capsule lower part receiver 46 and a lower face 128 of the capsule upper part receiver 44 which is preferably associated with a mutual centering.

In an initial position, the closing surface 92 of the closing element 90 is spaced apart from the capsule lower part 16. In a next step, the counter holder 98 is lowered downwardly out of the stop region 104 so that the counter holder 98 penetrates the transport sleeve 106 which is arranged in the transport region 108 (see FIG. 10). The movement of the counter holder 98 is stopped when the counter holder 98 contacts an upper face 130 of the capsule upper part 14 with its mating surface 100.

Figure 11:
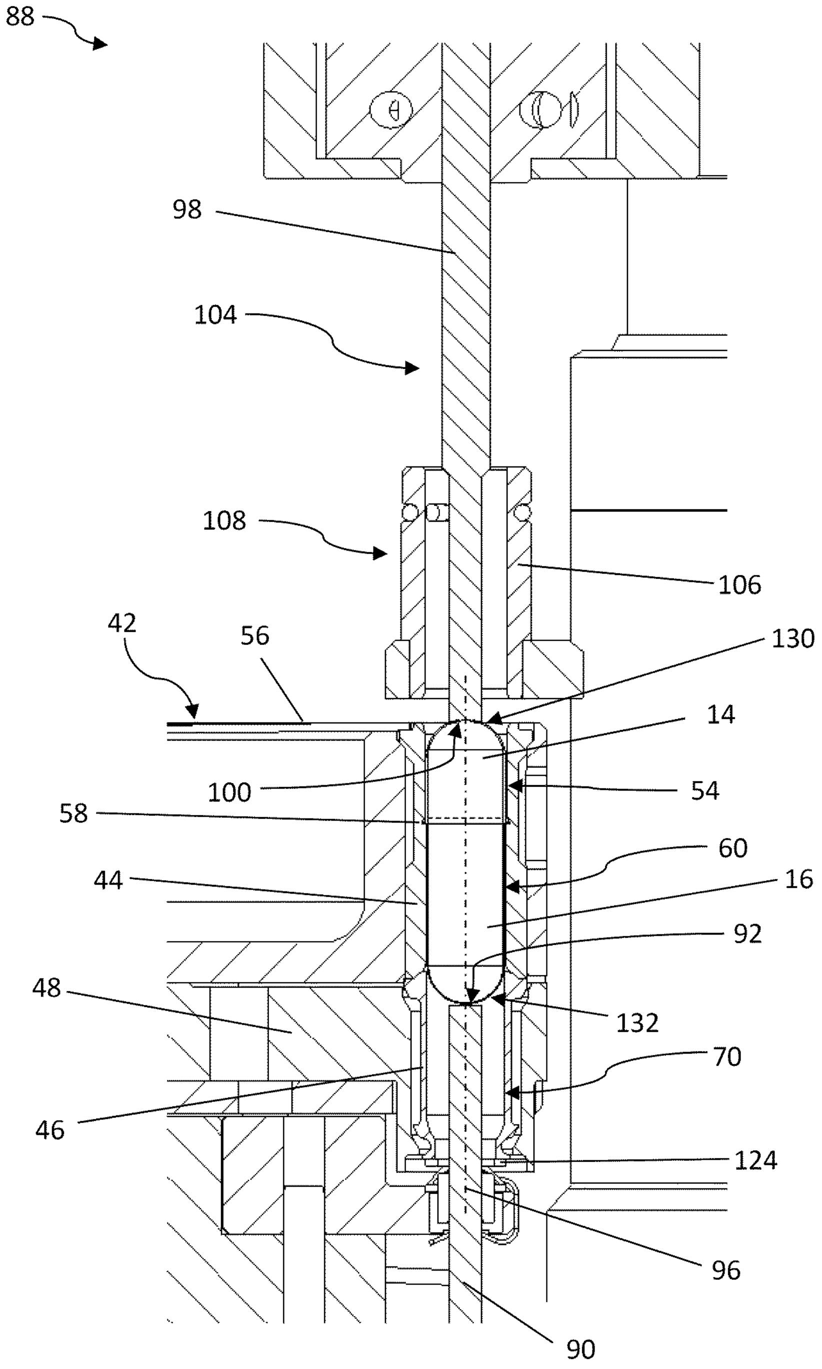

Then the capsule lower part 16 is moved by a movement of the closing element 90 in the direction of the capsule upper part 14, wherein the closing surface 92 contacts a lower face 132 of the capsule lower part 16 (see FIG. 11). The capsule lower part 16 penetrates into the guide region 60 of the capsule upper part receiver 44 and is guided in the guide region 60. When the capsule lower part 16 reaches the holding region 54, the edges 22, 24 of the capsule parts 14, 16 are arranged at the same height. Proceeding therefrom, the actual joining process, in which the capsule lower part 16 is inserted into the capsule upper part 14 along the joining path 27 (see FIG. 1*b*), is started. During the joining process, the capsule upper part 14 is subjected by means of the mating surface 100 of the counter holder 98 to a force which is oriented opposite the direction of movement of the closing element 90.

The force exerted by the counter holder 98 on the capsule upper part 14 can be adjusted irrespective of the position of the counter holder 98 and, in particular, can be constant, for example by the action of a weight force of the counter holder 98 and/or by subjecting the counter holder 98 to a constant drive force which, for example, is generated pneumatically. A pressure relief valve can be used for equalizing such a drive force.

Figure 12:
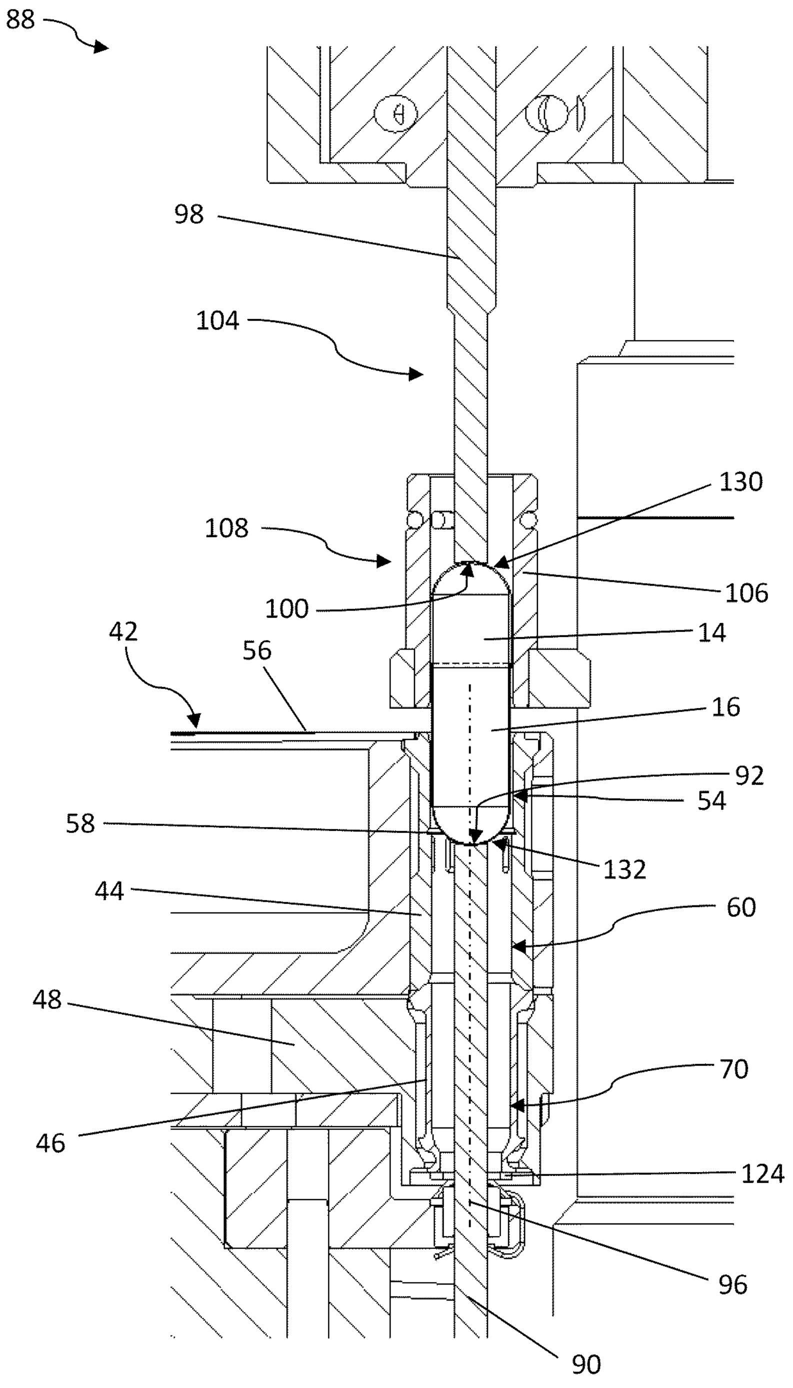

At the start of the joining process, the counter holder 98 is moved back upwardly (in particular passively) in the direction of the stop region 104, while the closing element 90 continues its movement upwardly (see FIG. 12). The counter holder 98 and the closing element 90 remain in contact with the respective capsule parts 14, 16 during their respective movements, whereby the now pre-joined capsule 12 is also moved upwardly and passes into the transport region 108 or into the transport sleeve 106.

Figure 13:
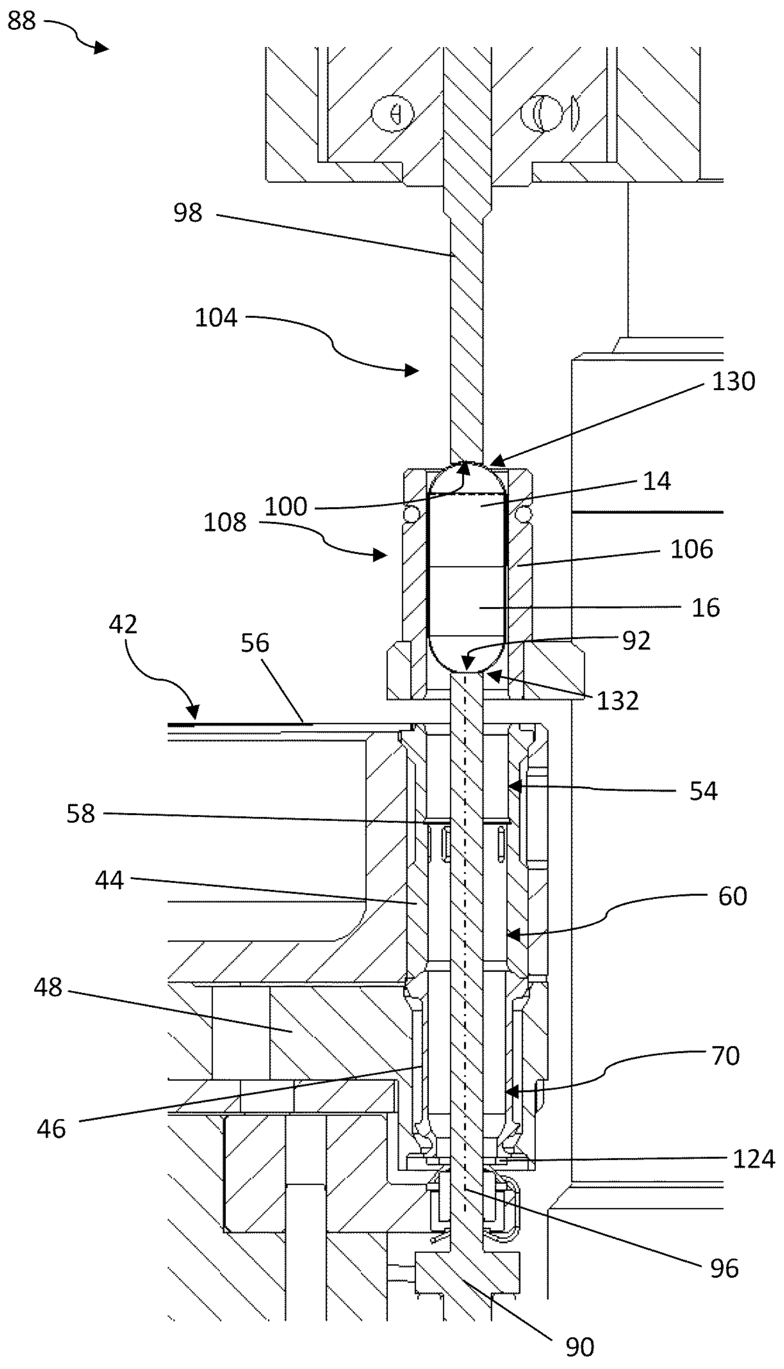

The movement of the counter holder 98 ends when the counter holder 98 is arranged back in its initial position in the stop region 104 (see FIG. 13). The closing element 90 moves further upwardly—while the counter holder 98 is already arranged and fixed back in the stop region 104—so that for a final part of the joining path 27 the capsule lower part 16 is inserted sufficiently far into the capsule upper part 14 that the capsule 12 is fully joined and closed.

Figure 14:
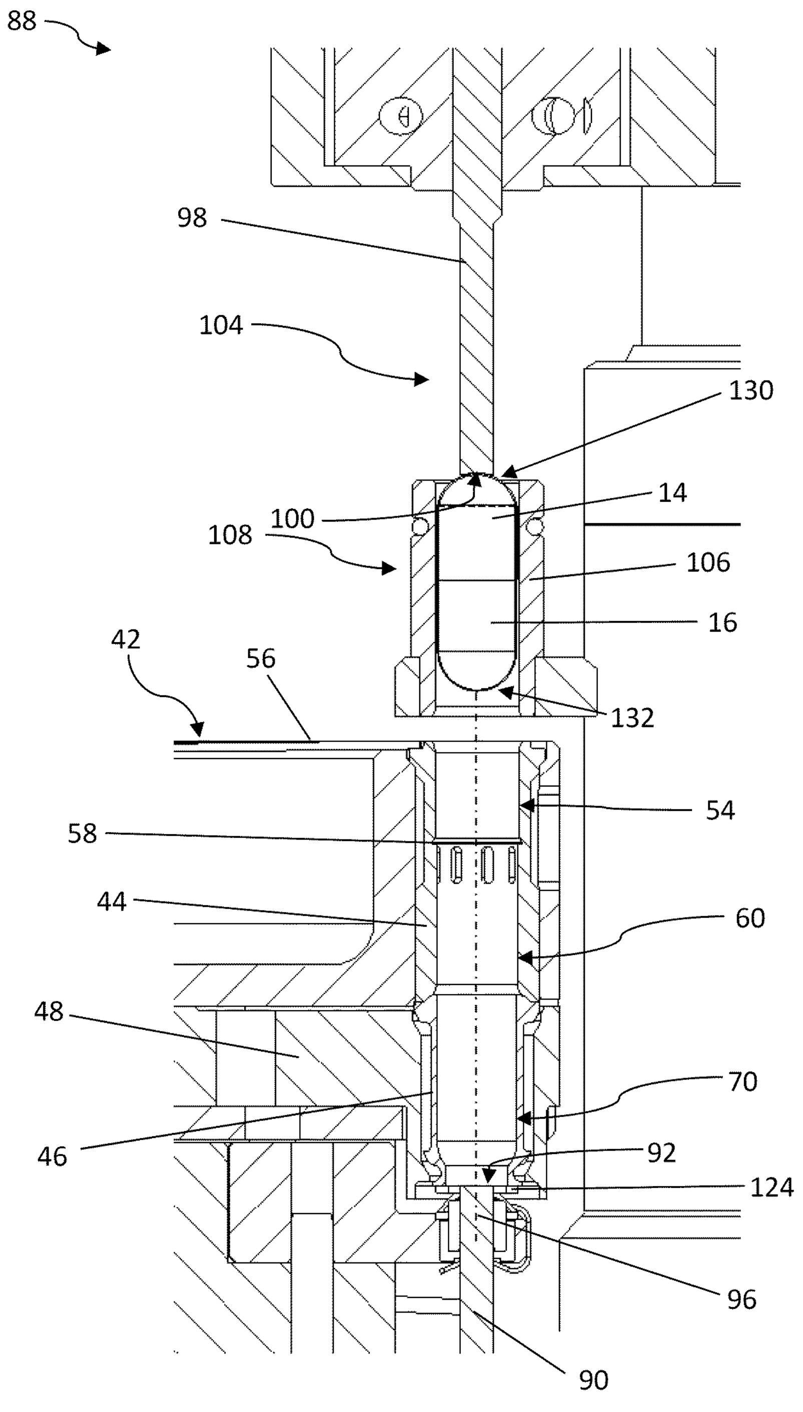

The fully joined capsule 12 is held in the transport sleeve 106 (see FIG. 14). Then the closing element 90 is moved back out of the conveying region 42 into its initial position (see FIG. 14, proceeding from FIG. 13).

Figure 15:
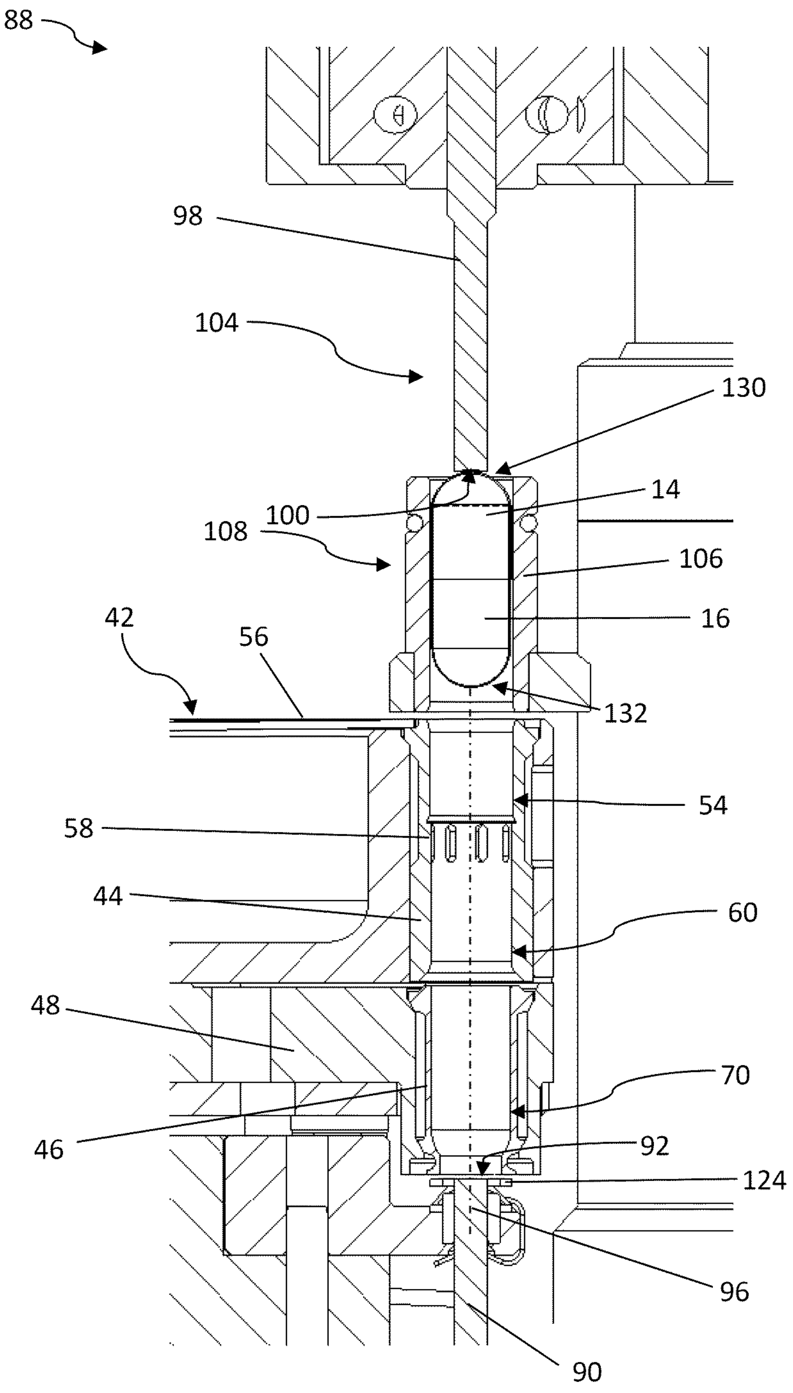

Proceeding from the state according to FIG. 14, the conveying device 32 is lifted parallel to the axis of rotation 34 of the conveying device (see FIG. 15, proceeding from FIG. 14).

Figure 16:
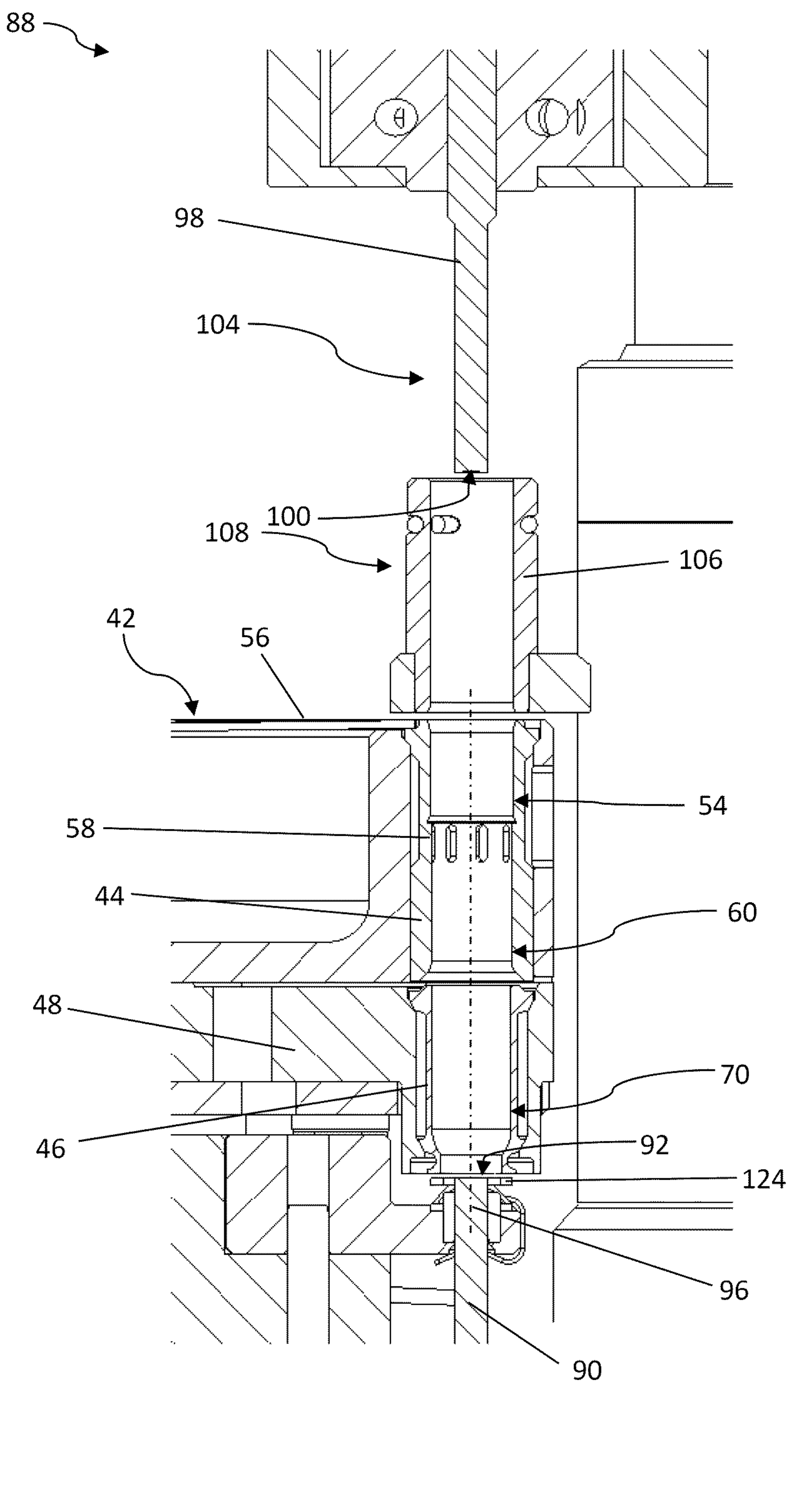

By a subsequent rotation of the transport element 110, the capsule 12 which is held in the transport sleeve 106 is moved out of the transport region 108 and transported further, see FIG. 16, now without the capsule 12, and FIG. 6.

Alternatively to the above-described method, it is also possible that the counter holder 98 remains in its position in the stop region 104 and the mating surface 100 of the counter holder 98 contacts the capsule upper part 14 only for the final part of the joining path 27. In this case, the final part of the joining process takes place only in the transport sleeve 106 or in the transport region 108.

What is claimed is:

1. A capsule filling machine (10) for filling a capsule (12) which has two capsule parts, namely a capsule upper part (14) and a capsule lower part (16), the capsule filling machine comprising:

a conveying device (32) which has a capsule upper part receiver (44) for receiving a capsule upper part (14) and a capsule lower part receiver (46) for receiving a capsule lower part (16), wherein the capsule upper part receiver (44) and the capsule lower part receiver (46) can be arranged so as to be aligned with one another along a joining axis (26), wherein the conveying device (32) can be driven by a conveying drive (36) so as to be movable within a conveying region (42), at least one filling station (82) for filling the capsule lower part (16) with a filling material, and at least one station (86) for closing a filled capsule lower part (16) with a capsule upper part (14) and for transporting a filled and fully joined capsule (12), wherein the station (86) comprises a closing element (90) which can be moved along the joining axis (26) and which is driven by a closing drive (94), and which cooperates with a lower face (132) of the filled capsule lower part (16), and a counter holder (98) which cooperates with an upper face (130) of the capsule upper part (14), wherein the counter holder (98) is arranged, at least for a final part of a joining path (27) between the filled capsule lower part (16) and the capsule upper part (14), in a stop region (104) which, when viewed along the joining axis (26), is spaced apart from the conveying region (42) by interposition of a transport region (108), wherein a transport sleeve (106) which fixes and transports the filled and fully joined capsule (12) outside the conveying region (42) is arranged in the transport region (108), a transport element (110), including the transport sleeve (106), rotates about a transport element axis (116), and the conveying device (32), including the capsule upper and lower part receivers (44, 46), rotates about a conveying device axis of rotation (34), and the transport element axis (116) and the conveying device axis of rotation (34) are parallel and offset such that the transport sleeve (106) and the capsule upper and lower part receivers (44, 46) are rotatable to be aligned along the joining axis (26).

2. The capsule filling machine (10) according to claim 1, wherein a height (109) of the transport region (108) measured between the conveying region (42) and the stop region (104) corresponds at least to a length (28) of a filled and fully joined capsule (12).

3. The capsule filling machine (10) according to claim 1, wherein the counter holder (98) can be moved along the joining axis (26), and in the conveying region (42) and/or in the transport region (108) acts on the upper face (130) of the capsule upper part (14).

4. The capsule filling machine (10) according to claim 3, wherein the counter holder (98) which is arranged in the conveying region (42) or the transport region (108) can be moved into the stop region (104) by a movement of the closing element (90) which is transmitted to the counter holder (98) via the capsule parts (14, 16).

5. The capsule filling machine (10) according to claim 4, wherein the counter holder (98) exerts, on the upper face (130) of the capsule upper part (14), a force which opposes a direction of movement of the closing element (90).

6. The capsule filling machine (10) according to claim 1, wherein the closing drive (94) is configured such that the closing element (90) moves along the joining axis (26), starting from an initial contact with the lower face (132) of the filled capsule lower part (16) up to completion of the final part of the joining path (27), without interruption and stoppage.

7. The capsule filling machine (10) according to claim 1, wherein the capsule upper part receiver (44) has a holding region (54) for receiving and holding the capsule upper part (14) and a guide region (60) facing the capsule lower part receiver (46) for receiving and guiding the capsule lower part (16).

8. The capsule filling machine (10) according to claim 7, wherein the holding region (54) of the capsule upper part receiver (44) is defined by an annular projection (58), an annular edge (22) of the capsule upper part (14) being able to be supported or being supported thereby.

9. The capsule filling machine (10) according to claim 7, wherein a length of the guide region of the capsule upper part receiver (44), when viewed along the joining axis (26), corresponds to at least 30% of a length of the capsule lower part (16).

10. The capsule filling machine (10) according to claim 9, wherein the length of the guide region of the capsule upper part receiver (44), when viewed along the joining axis (26), corresponds to at least 70% of the length of the capsule lower part (16).

11. The capsule filling machine (10) according to claim 10, wherein the length of the guide region of the capsule upper part receiver (44), when viewed along the joining axis (26), corresponds to 100% of the length of the capsule lower part (16).

12. The capsule filling machine (10) according to claim 1, wherein the capsule upper part receiver (44) has a slotted wall (66).

13. The capsule filling machine (10) according to claim 1, wherein the capsule upper part receiver (44) and the capsule lower part receiver (46) are configured in each case as format parts which can be inserted into the conveying device (32).

14. The capsule filling machine (10) according to claim 1, wherein the conveying device (32) is configured in a disk-shaped manner and wherein the conveying drive (36) drives the conveying device (32) about the conveying device axis of rotation (34).

15. The capsule filling machine (10) according to claim 1, wherein the transport sleeve (106) and the transport element (110) are part of a transport device (112) which is configured as a sorting device.

16. The capsule filling machine (10) according to claim 15, wherein the transport device (112) has a transport drive (114) which drives the transport element (110) about the transport element axis (116) which is arranged offset to the conveying device (32).

17. A method for operating a capsule filling machine according to claim 1, wherein the conveying device (32) moves the capsule upper part (14) and the filled capsule lower part (16) into the station (86) for closing and for transport, the closing element (90) is moved along the joining axis (26) and acts on the lower face (132) of the capsule lower part (16), the capsule lower part (16) is inserted into the capsule upper part (14) along a first part of the joining path (27), the capsule parts (14, 16) are joined together further along a second part of the joining path (27) following the first part of the joining path (27) and at the same time are moved into the transport region (108), and the capsule parts (14, 16) are joined together on the final part of the joining path (27) when the upper face (130) of the capsule upper part (14) bears against the counter holder (98) which is arranged in the stop region (104).

* * * * *